Figure 5:
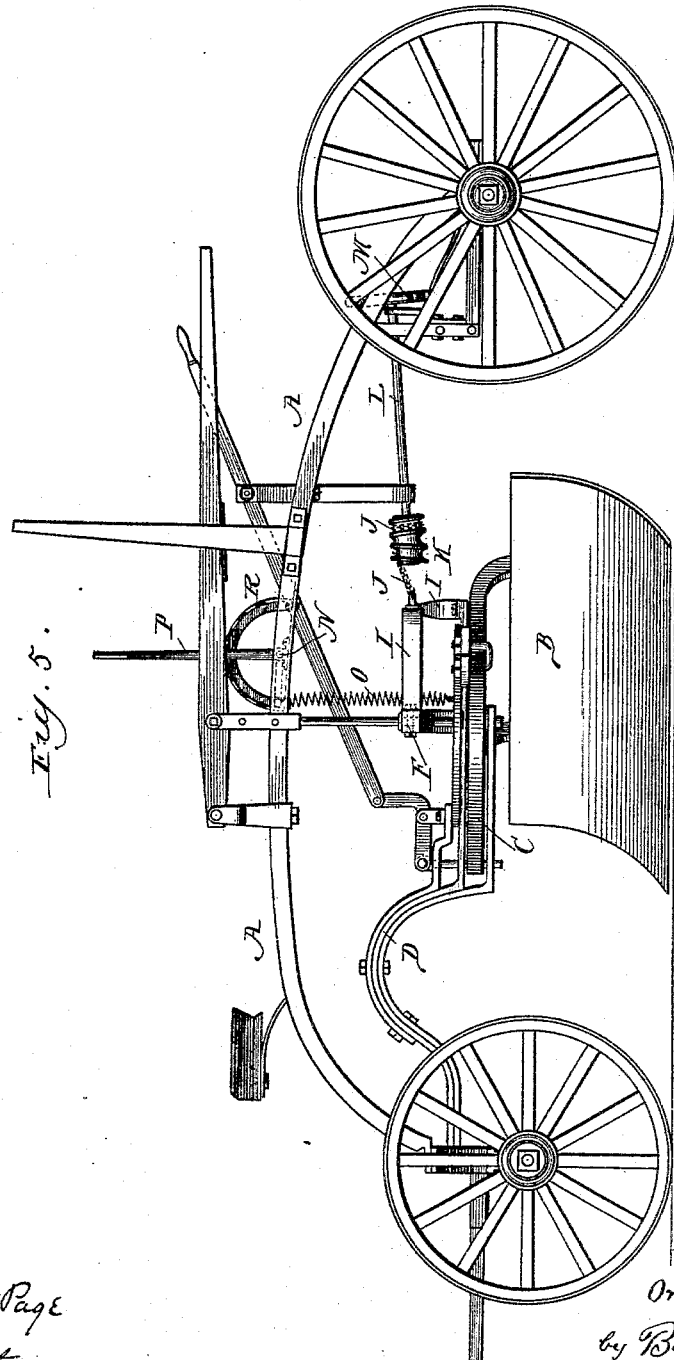

(No Model.)  2 Sheets—Sheet 1.
O. E. MOATS.
ROAD SCRAPER.
No. 412,036. Patented Oct. 1, 1889.
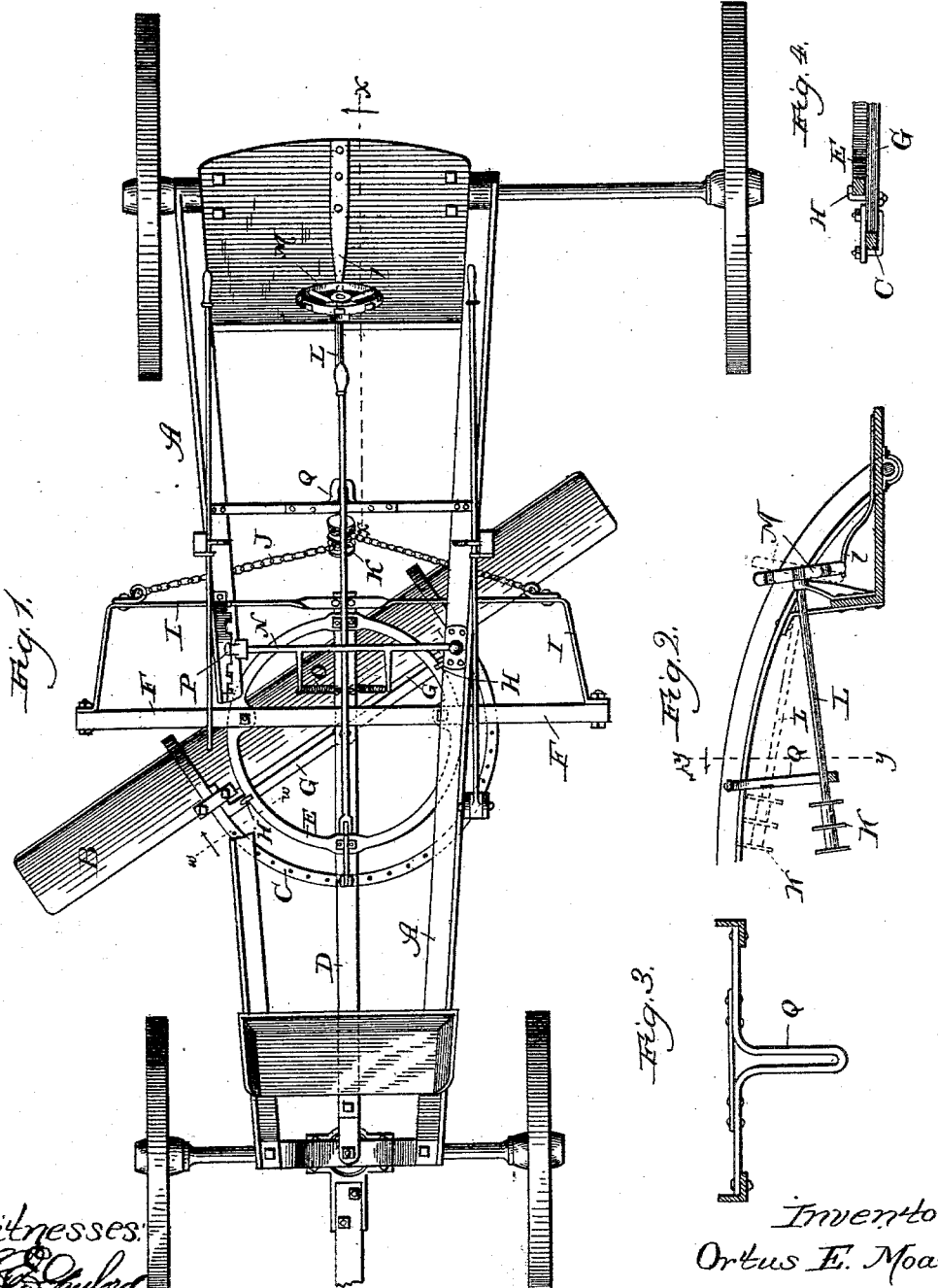
Witnesses:
Inventor
Ortus E. Moats,
By Banning & Banning
Att'ys (No Model.) 2 Sheets—Sheet 2.

O. E. MOATS.
ROAD SCRAPER.

No. 412,036. Patented Oct. 1, 1889.

Witnesses
Chas. G. Page
A. Coates

Inventor
Ortus E. Moats
by Banning & Banning
Attorneys

UNITED STATES PATENT OFFICE.

ORTUS E. MOATS, OF CHICAGO, ILLINOIS, ASSIGNOR TO FREDERICK C. AUSTIN, OF SAME PLACE.

ROAD-SCRAPER.

SPECIFICATION forming part of Letters Patent No. 412,036, dated October 1, 1889.

Application filed February 27, 1888. Serial No. 265,485. (No model.)

*To all whom it may concern:*

Be it known that I, ORTUS E. MOATS, a citizen of the United States, residing at Chicago, Illinois, have invented certain new and useful Improvements in Road-Scrapers, of which the following is a specification.

In the drawings, Figure 1 is a plan view of my improved road-scraper. Fig. 2 is a side elevation of some of the parts, taken in the line $x$ of Fig. 1, looking in the direction of the arrow. Fig. 3 is an end view of the guide and support for the forward end of the worm or drum shaft, taken through the line $y\ y$ of Fig. 2, looking in the direction of the arrows; and Fig. 4 is a detail view of some of the parts, taken in the line $w$ of Fig. 1, looking in the direction of the arrow. Fig. 5 represents the machine in side elevation.

In the drawings, A represents the frame of the machine; B, the scraper-blade; C, the semicircular hanger by which the scraper-blade is suspended; D, the draft-bar; E, a supporting-circle bolted or fastened to the draft-bar; F, a transverse adjusting-bar passing beneath the main frame of the machine and bolted or fastened to the supporting-circle E; G, a sway-bar extending from one side of the semicircular hanger to the other, pivoted at its center to the draft-bar; H, travelers or hanger-bolts for holding the sway-bar and the supporting-circle in proper relations to each other; I, a brace-piece attached to the ends of the adjuster-bar and bolted to the rear end of the draft-bar; J, an adjusting-chain passing from one end of the brace-piece to the other; K, a worm or drum around which the chain passes and by which it is adjusted; L, the worm or drum shaft; M, a hand-wheel for turning the worm or drum shaft; $l$, a spring for holding it in position; N, a tumbler for regulating the tension of the supporting-springs; O, such supporting-springs; P, a lever for changing the position of the tumblers, and Q a supporting or guiding piece for the forward end of the worm or drum.

In constructing my improved road-scraper I use the ordinary frame-work, consisting of two pairs of wheels and side bars extending from the front to the rear axles, connecting them together. I mount a driver's seat on the frame-bars near the front end and a platform at the rear end, on which the operator may stand and regulate the operation of the machine. I run a draft-bar back from the front axle a sufficient distance to afford room to attach the scraper-blade near its rear end. The object of this draw-bar is of course to draw the scraper-blade forward in its operation in actual work. I make a semicircular hanger C, which passes beneath the draw-bar and through a slot in the same, or through any suitable guide attached to the under side of the draw-bar. This semicircular hanger is turned down at the ends, so that it can be attached to the scraper-blade, and it is provided with a number of holes to enable it to be held at any desired position by a pin passing through a hole in the draw-bar and one of the holes in the hanger. In addition to this semicircular hanger I employ a supporting-circle E, which is intended to be bolted or otherwise rigidly connected to the draft-bar at its front and at its rear sides. Crossing this supporting-circle is arranged an adjuster-bar, which is bolted or otherwise attached to the sides of the supporting-circle. The ends of this adjusting-bar extend out beyond the circle any convenient distance. To the ends of this adjusting-bar I attach, by bolts or otherwise, a brace-bar I, which is preferably extended back for some distance behind the adjuster-bar, where it is bent across, bolted to the rear end of the draft-bar, and extended across and bent forward, so as to be bolted or otherwise attached to the end of the adjuster-bar. In this way this brace becomes a part of the adjuster-bar.

At each side near the point where the brace-bar turns to effect its connection with the adjuster-bar I attach an adjusting-chain, which passes across under the frame-work of the machine and around the worm or drum K. It should pass around the worm or drum once or twice, so that as the worm or drum is turned the chain will be wound on one side and unwound on the other. The worm or drum is provided with a shaft, which extends back through a support or guide Q and terminates in a hand-wheel M, by which it may be turned. The end which is provided with a hand-wheel passes loosely through a hole in a bracket, so that its position may be changed. The support or guide Q is open above the shaft, so that as the scraper-blade and connecting parts are raised the front end of the shaft may also rise to maintain its proper relation with them. This is shown by reference to Figs. 2 and 3, in the first of which the shaft is shown down by full lines and up by dotted lines.

The sway-bar G is pivoted to the draw-bar and its ends attached to the sides of the semicircular hanger, as shown in Fig. 1. To keep it in its proper relations to the supporting-circle, travelers or hangers H are provided. These consist of bolts passing through the sway-bar and extending up a proper distance and then being bent over, so that they will form hooks embracing the supporting-circle. These are particularly shown in Fig. 4. As the angle of the scraper-blade is changed from time to time, the position of the sway-bar is changed to correspond, and its travelers or hangers permit it to move around the supporting-circle without permitting its ends to change their relative position to such circle.

To assist in supporting the weight of the scraper-blade, I employ springs, and by springs I mean either one or more, which extend up from the draft-bar or other portion of the scraper-blade-supporting mechanism and are attached at their upper ends to an adjustable tumbler N, which extends from one side of the frame to the other, in which its ends are journaled and which is adjustable by turning in the journals.

To change the position of the tumbler, so as to increase or decrease the tension of the spring, I employ a lever P, which is rigidly attached to it and which extends up a convenient distance. The lever may be held in position after it has been moved back or forward by allowing it to rest in one of the notches of a semicircular piece bolted to the frame shown in Fig. 1. Said lever and notched piece or rack for holding it are best shown in Fig. 5, wherein an arm for one of the springs is shown in dotted lines. It will be seen that said arm and lever have a common pivot and that they are arranged at such angles relatively to one another as to practically constitute a bell-crank lever. The attendant can readily take hold of the hand-lever P for the purpose of raising or lowering the point from which the spring is suspended.

To adjust the longitudinal position of the scraper-blade, the adjusting-bar F is moved back or forth by means of an adjusting-chain J, as it is wound in one direction or the other around the worm or drum K. As the adjuster-bar moves to the one side or the other it carries with it the draft-bar, supporting-circle, and of course the scraper-blade and other connecting parts. In this way the position of the scraper-blade may be changed or adjusted from time to time.

It will be noticed that the position of the worm or drum shaft is horizontal instead of vertical, as shown in my patent of January 10, 1888. This enables the front end to be vertically adjustable or to rise and fall with the other parts, as above explained.

I have described the machine as it is represented in the drawings; but it is obvious that many minor changes could be made, and I do not, therefore, intend to limit myself to specific forms and details of construction where changes could be made without involving invention.

What I regard as new, and desire to secure by Letters Patent, is—

1. In a road-scraper, the combination of a frame, a draft-bar, a scraper-blade connected thereto, an adjustable tumbler, and supporting-spring connecting the tumbler and scraper-blade-supporting mechanism, substantially as described.

2. In a road-scraper, the combination of a frame, a draft-bar, a scraper-blade connected thereto, a horizontal drum or worm shaft, and around the drum or worm of which an adjusting-chain is wound, and means for rotating the drum or worm shaft in one direction or the other, substantially as described.

3. In a road-scraper, the combination of a frame, a draft-bar, a scraper-blade connected thereto, a horizontal drum or worm shaft vertically adjustable at its forward end, and around the drum or worm of which an adjusting-chain is wound, and means for rotating the drum or worm shaft in the one direction or the other, substantially as described.

4. In a road-scraper, the combination of a frame, a draft-bar, a scraper-blade pivotally connected thereto, a transverse adjuster-bar moving the draft-bar and scraper-blade to the one side or the other as it is moved, a chain connected with the adjuster-bar near its ends, and a horizontal drum or worm around which the chain passes and by which either end may be shortened or lengthened at pleasure, whereby the scraper-blade and supporting mechanism may be moved toward one side of the machine or the other, substantially as described.

ORTUS E. MOATS.

Witnesses:
GEORGE S. PAYSON,
THOMAS A. BANNING.